United States Patent
Kondo et al.

(10) Patent No.: US 9,482,341 B2
(45) Date of Patent: Nov. 1, 2016

(54) CONTROL DEVICE FOR AUTOMATIC TRANSMISSION

(71) Applicants: Masami Kondo, Niwa-gun (JP); Akio Sugawara, Toyota (JP); Shuntaro Shinohara, Toyota (JP)

(72) Inventors: Masami Kondo, Niwa-gun (JP); Akio Sugawara, Toyota (JP); Shuntaro Shinohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/773,884

(22) PCT Filed: Mar. 11, 2013

(86) PCT No.: PCT/JP2013/056686
§ 371 (c)(1),
(2) Date: Sep. 9, 2015

(87) PCT Pub. No.: WO2014/141368
PCT Pub. Date: Sep. 18, 2014

(65) Prior Publication Data
US 2016/0017995 A1 Jan. 21, 2016

(51) Int. Cl.
*F16H 59/36* (2006.01)
*F16H 61/686* (2006.01)
*F16H 61/06* (2006.01)
(Continued)

(52) U.S. Cl.
CPC .......... *F16H 61/686* (2013.01); *F16H 59/36* (2013.01); *F16H 61/061* (2013.01); *F16H 59/42* (2013.01); *F16H 63/502* (2013.01); *F16H 2059/366* (2013.01); *F16H 2200/0052* (2013.01); *F16H 2200/2007* (2013.01); *F16H 2200/2023* (2013.01); *F16H 2200/2043* (2013.01); *F16H 2200/2082* (2013.01)

(58) Field of Classification Search
None
See application file for complete search history.

(56) References Cited

U.S. PATENT DOCUMENTS

| 5,816,979 A * | 10/1998 | Shiiba ............... F16H 61/143 477/174 |
| 6,270,444 B1 * | 8/2001 | Tsutsui ............ F16H 61/0437 475/127 |
| 2004/0242359 A1 | 12/2004 | Sugawara et al. |
| 2007/0155584 A1 | 7/2007 | Tabata et al. |

(Continued)

FOREIGN PATENT DOCUMENTS

| CN | 1573174 A | 2/2005 |
| JP | 2006-161934 A | 6/2006 |

(Continued)

*Primary Examiner* — Justin Holmes
(74) *Attorney, Agent, or Firm* — Oliff PLC

(57) ABSTRACT

A control apparatus for automatic-transmission provided with input-clutch through which drive force generated by engine is input to automatic-transmission, released-side frictional coupling device being placed in released state to perform shifting action of automatic-transmission, and engaged-side frictional coupling device being placed in engaged state to perform shifting action, control apparatus including: first shifting mode control means including slipping means for placing input-clutch in released state, engaging means for placing input-clutch in engaged state, and releasing/engaging switching control means for controlling shifting action of automatic-transmission being performed in first shifting mode wherein released-side frictional coupling device is brought into released state, and engaged-side frictional coupling device is brought into engaged state, while input-clutch is placed in released or slipping state under control of slipping means, and input-clutch is then brought into engaged state under control of engaging means, with a change of operating speed of engine connected to input-shaft of automatic-transmission.

4 Claims, 8 Drawing Sheets

(51) Int. Cl.
*F16H 59/42* (2006.01)
*F16H 63/50* (2006.01)

(56) References Cited

U.S. PATENT DOCUMENTS

2008/0172161 A1* 7/2008 Kondo .................. F16H 61/143
701/66

2009/0118084 A1* 5/2009 Heap ...................... B60K 6/365
477/5
2010/0228412 A1* 9/2010 Sah ........................ B60K 6/365
701/22

FOREIGN PATENT DOCUMENTS

| JP | 2006-177424 A | 7/2006 |
|----|---------------|--------|
| JP | 2007-002899 A | 1/2007 |

* cited by examiner

|  | C1 | C2 | B1 | B2 | B3 | F1 |
|---|---|---|---|---|---|---|
| 1ST | ○ |  |  | ◎ |  | △ |
| 2ND | ○ |  | ○ |  |  |  |
| 3RD | ○ |  |  |  | ○ |  |
| 4TH | ○ | ○ |  |  |  |  |
| 5TH |  | ○ |  |  | ○ |  |
| 6TH |  | ○ | ○ |  |  |  |
| R |  |  |  | ○ | ○ |  |
| N |  |  |  |  |  |  |

◎ ENGAGED FOR ENGINE BRAKE APPLICATION
△ ENGAGED FOR VEHICLE DRIVING

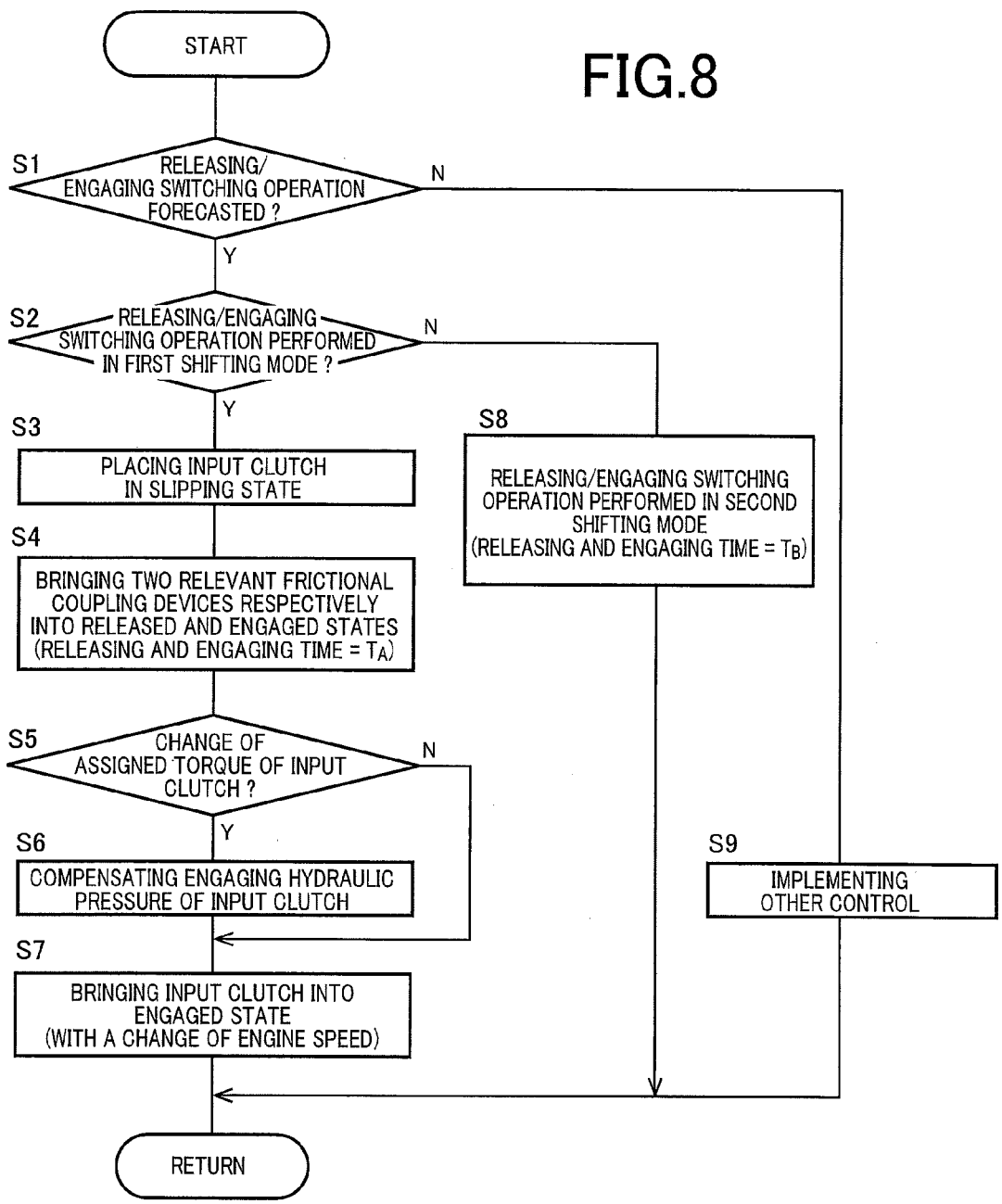

CONTROL DEVICE FOR AUTOMATIC TRANSMISSION

TECHNICAL FIELD

The present invention relates to a control device for an automatic transmission, and more particularly to a technique which permits a control of a shifting action of the automatic transmission by controlling an engaging action of a frictional coupling element.

BACKGROUND ART

There is well known a technique for shifting a transmission having a plurality of frictional coupling devices, with a clutch-to-clutch shifting operation (a releasing/engaging switching operation) in which one of the frictional coupling devices is brought into a released state while another of the frictional coupling devices is brought into an engaged state. In this clutch-to-clutch shifting operation, the shifting action of the transmission is controlled according to changes of torque capacities of the two relevant frictional coupling devices. To implement the shifting action, therefore, the torques to be transmitted through these two frictional coupling devices are required to be intricately controlled.

When a shift-up action of the automatic transmission is performed with the clutch-to-clutch shifting operation, for instance, the torque capacity of the frictional coupling device to be engaged is gradually increased in a torque phase of the shift-up action, and a rate of increase of the torque capacity of that frictional coupling device is held relatively low after the shift-up action has entered an inertia phase, so that an operating speed of an engine (namely, a rotating speed of an input shaft of the automatic transmission) is controlled while a rate of increase of an output torque of the automatic transmission in the inertia phase is held relatively low.

That is, the frictional coupling device to be engaged has effect on both of the rate of change of the torque capacity of the relevant frictional coupling device in the torque phase, and the change of the operating speed of the engine in the inertia phase. Accordingly, where the rate of increase of the torque capacity of the relevant frictional coupling element is increased to reduce a period of time of the torque phase, there is a risk of delay or variation in the control to reduce the rate of increase of the torque capacity in the inertia phase. In this case, an excessively large value of the torque capacity of the relevant frictional coupling element in the inertia phase may cause generation of a shifting shock of the automatic transmission.

In view of the problem described above, there has been proposed to shift the automatic transmission by controlling three frictional coupling devices consisting of the two frictional coupling devices associated with the clutch-to-clutch shifting operation and an input clutch through which a vehicle drive force is transmitted to the automatic transmission. Patent Document 1 discloses an example of this proposal. Namely, Patent Document 1 discloses a technique to reduce a torque capacity of the input clutch for limiting the torque to be transmitted to an automatic transmission during the shifting action.

PRIOR ART DOCUMENT

Patent Document

Patent Document 1: JP-2007-2899 A1

SUMMARY OF THE INVENTION

Object Achieved by the Invention

In the technique disclosed in Patent Document 1 also, the frictional coupling device to be engaged has effect on both of the rate of change of the torque capacity of the frictional coupling device to be engaged, in the torque phase of the shifting action, and the change of the operating speed of the engine in the inertia phase. Therefore, it is considered that there is still a possibility of generation of the shifting shock.

The present invention was made in view of the background art described above. It is therefore an object of the present invention to provide a control device for an automatic transmission, which control device permits a high degree of accuracy of control of a releasing/engaging switching operation (clutch-to-clutch switching operation) to shift the automatic transmission.

Means for Achieving the Object

The object indicated above is achieved according to a first aspect of the present invention, which provides a control apparatus for (a) an automatic transmission provided with an input clutch through which a drive force is input to the automatic transmission, a released-side frictional coupling device to be placed in a released state to perform a shifting action of the automatic transmission, and an engaged-side frictional coupling device to be placed in an engaged state to perform the above-described shifting action, characterized in that (b) the above-described shifting action is performed in a first shifting mode in which the above-described released-side frictional coupling device is brought into the released state, and the above-described engaged-side frictional coupling device is brought into the engaged state, while the above-described input clutch is placed in a slipping state, and (c) the above-described input clutch is then brought into an engaged state with a change of an operating speed of an engine connected to an input shaft of the above-described automatic transmission.

Advantages of the Invention

According to the first aspect of the invention described above, the released-side and engaged-side frictional coupling devices are respectively brought into the released and engaged states while the input clutch is placed in the released or slipping state, and then the input clutch is brought into the engaged state. While the prior art requires a complicated control for coordination to reduce generation of a shifting shock in the releasing and engaging actions of the frictional coupling devices, the present invention permits an easier control of the releasing and engaging actions. In addition, the input clutch is brought into the engaged state after the released-side frictional coupling device and the engaged-side frictional coupling device are respectively brought into the released and engaged states, so that the shifting action of the automatic transmission can be controlled and easily coordinated, by controlling the engaging action of the input clutch, irrespective of a specific one of a plurality of different shifting actions of the automatic transmission each involving the releasing and engaging actions of the two frictional coupling devices.

According to a second aspect of the invention, (a) the above-described shifting action is performed in a second shifting mode in which the above-described engaged-side frictional coupling device is brought into the engaged state with a change of the operating speed of the above-described engine, while the above-described released-side frictional coupling device is brought into the released state, and (b) a length of time required for completing a releasing action of the above-described released-side frictional coupling device and an engaging action of the above-described engaged-side frictional coupling device in the above-described first shifting mode is shorter than that in the above-described second shifting mode. Accordingly, the shifting action can be performed in one of the first and second shifting modes which is selected depending upon the condition in which the shifting action is required to be performed.

BRIEF DESCRIPTION OF THE DRAWINGS

FIG. 8 is a flow chart for explaining a major control operation of the electronic control device of FIG. 3.

MODE FOR CARRYING OUT THE INVENTION

Figures 1, 2:
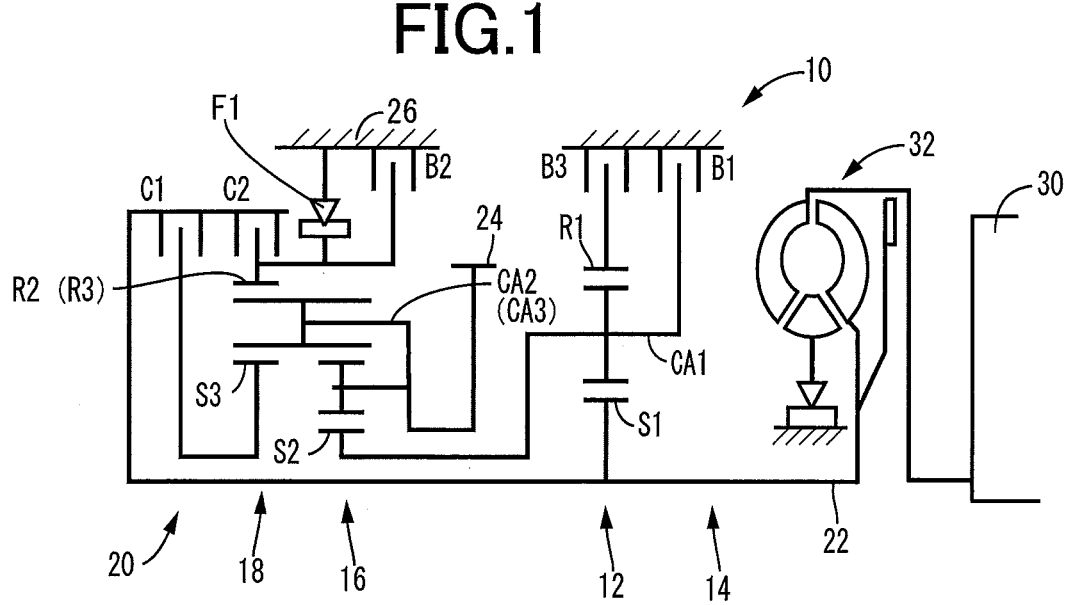
FIG. 1 is a schematic view for explaining an arrangement of a vehicular automatic transmission to which the present invention is applicable.
FIG. 2 is a table indicating operating states of coupling elements of the vehicular automatic transmission of FIG. 1.

Referring to the drawings, an embodiment of the present invention will be described in detail.

First Embodiment

FIG. 1 is the schematic view of a vehicular automatic transmission 10, and FIG. 2 is the table indicating operating states of coupling elements to establish a plurality of shift positions of the automatic transmission 10. This automatic transmission 10 is suitably used for an FF vehicle, and is installed in the lateral (transverse) direction of the vehicle. The automatic transmission 10 includes a first transmission portion 14 and a second transmission portion 20 which are disposed coaxially with each other. The first transmission portion 14 is principally constituted by a first planetary gear set 12 of a single-pinion type, while the second transmission portion 20 is a transmission device of a Ravigneaux type which is principally constituted by a second planetary gear set 16 of a double-pinion type and a third planetary gear set 18 of a single-pinion type. A rotary motion of an input shaft 22 is transmitted to an output rotary member 24, at a selected one of speed ratios. The above-described input shaft 22 corresponds to an input member. In the present embodiment, the input shaft 22 is a turbine shaft of a torque converter 32 rotated by a vehicle drive power source in the form of an engine 30. On the other hand, the above-described output rotary member 24 corresponds to an output member of the automatic transmission 10, and functions as an output gear, namely, as a differential drive gear meshing with a differential driven gear (large-diameter gear) 36 of a differential gear device 34 shown in FIG. 3, so that a drive force is transmitted to the differential gear device 34. An output of the above-described engine 30 is transmitted to a pair of drive wheels (front wheels) 40 through the torque converter 32, the automatic transmission 10, the differential gear device 34, and a pair of axles 38. It is noted that a lower half of the automatic transmission 10, which is constructed substantially symmetrically with respect to its axis, is not shown in FIG. 1.

The automatic transmission 10 has six forward-drive shift positions consisting of a first-speed position (1st) through a sixth-speed position (6th), and a reverse-drive shift position (R). The forward-drive and reverse-drive shift positions are established with respective different combinations of mutual connections of rotary elements (sun gears S1-S3, carriers CA1-CA3 and ring gears R1-R3) of the first and second transmission portions 14 and 20. As indicated in FIG. 2, the first-speed position is established in engaged states of a clutch C1 and a brake B2, and the second-speed position is established in the engaged state of the clutch C1 and an engaged state of a brake B1, while the third-speed position is established in the engaged state of the clutch C1 and an engaged state of a brake B3. The fourth-speed position is established in the engaged state of the clutch C1 and an engaged state of a clutch C2, and the fifth-speed position is established in the engaged states of the clutch C2 and the brake B3, while the sixth-speed position is established in the engaged states of the clutch C2 and the brake B1. Further, the reverse-drive shift position is established in the engaged states of the brakes B2 and B3, and a neutral position is established in released states of all of the clutches C1 and C2 and the brakes B1-B3.

The table of FIG. 2 indicates combinations of the operating states of the clutches C1 and C2 and the brakes B1-B3, which correspond to the respective shift positions. In the table, "o" indicates the engaged state, while "a double circle ⊚" indicates the engaged state for engine brake application. The brake B2 is not required to be placed in the engaged state when the vehicle is started (accelerated), since a one-way clutch F1 is disposed in parallel with the brake B2 which is placed in the engaged state to establish the first-speed position (1st). The shift positions have respective speed ratio values which are suitably determined by gear ratios ρ1, ρ2, and ρ3 of the first, second and third planetary gear sets 12, 16 and 18 (=number of teeth of the sun gear/number of teeth of the ring gear). In FIG. 1, a reference sign 26 denotes a transmission casing.

Each of the above-described clutches C1 and C2 and brakes B1-B3 (hereinafter referred to simply as "clutches C" and "brakes B", unless otherwise specified) is a clutch or brake of a multiple-disc type, or a hydraulically operated frictional coupling device which is selectively placed in the engaged or released state, by a hydraulic actuator controlled by a corresponding one of linear solenoid valves SL1-SL5 incorporated within a hydraulic control unit 98 (shown in FIG. 3). The linear solenoid valves SL1-SL5 are turned on and off, and electric currents to be applied to these valves SL1-SL5 are controlled, to selectively place the respective coupling devices in the engaged or released states, and to regulate transient hydraulic pressures of the hydraulic actuators during engaging and releasing actions of the coupling devices.

Figure 4:
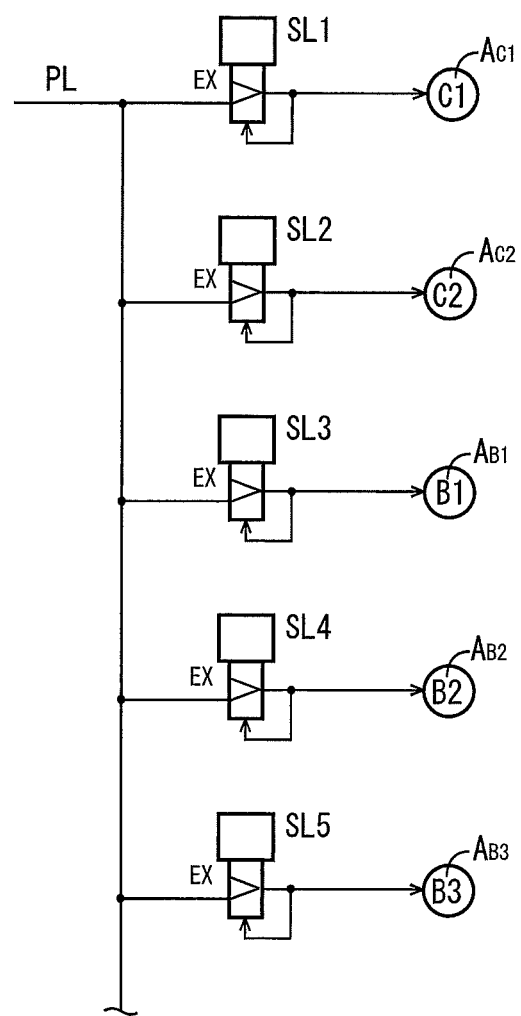
FIG. 4 is a circuit diagram showing major portions of a hydraulic control unit shown in FIG. 3.

FIG. 4 is the circuit diagram showing portions of the hydraulic control unit 98 associated with the linear solenoid valves SL1-SL5. These linear solenoid valves SL1-SL5 are controlled according to command signals received from an electronic control device 90, to regulate a line pressure PL into respective hydraulic pressures to be applied to hydraulic actuators (hydraulic cylinders) AC1, AC2, AB1, AB2 and AB3 for engaging actions of the respective clutches C1 and C2 and brakes B1-B3. A pressure relief valve not shown is provided to regulate an output pressure of a mechanical oil pump driven by the above-described engine 30, or an output pressure of an electromagnetic oil pump, to control the above-indicated line pressure PL to a value according to a load acting on the engine 30, which is represented by an operation amount of an accelerator pedal or an angle of opening of a throttle valve.

Figure 5:
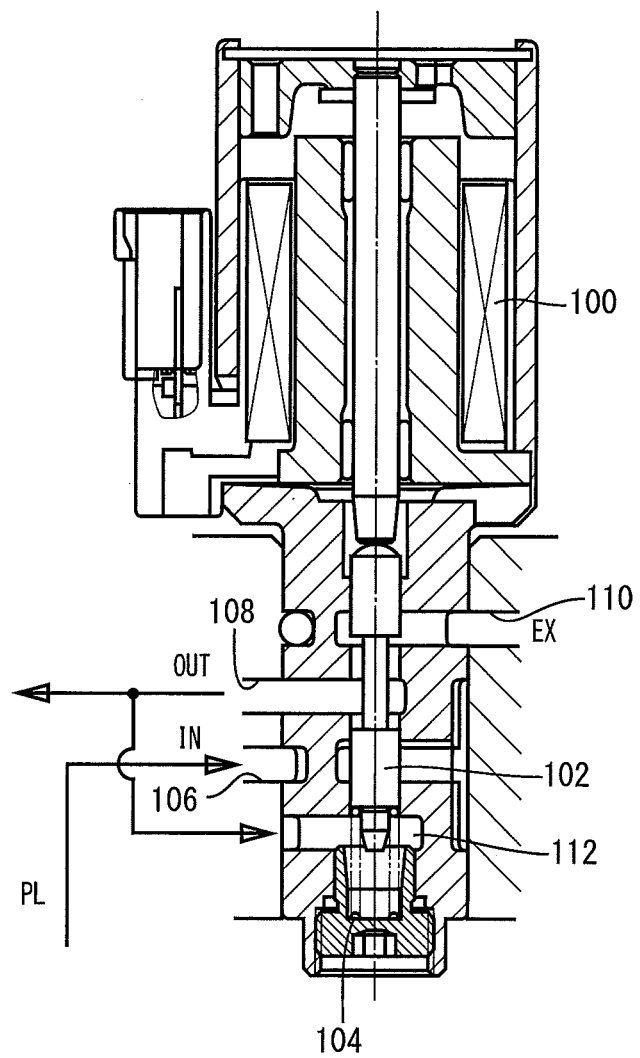
FIG. 5 is a cross sectional view showing an example of a linear solenoid valve shown in FIG. 4.

The above-described linear solenoid valves SL1-SL5, which function as transmission shifting solenoid valves, are basically identical in construction with each other, and are normally-closed type valves in the present embodiment. FIG. 5 shows an example of the transmission shifting solenoid valve, which is provided with: a solenoid coil 100 which generates an electromagnetic force according to an electric current applied thereto; a spool 102; a spring 104; an input port 106 which receives the line pressure PL; an output port 108 from which a regulated output pressure is delivered; a drain port 110; and a feedback oil chamber 112 which receives the output pressure. The output pressure (feedback pressure Pout) of this solenoid valve is regulated according to an amount of communication between the input port 106 and the output port 108 or the drain port 110 which is varied by the electromagnetic force which is generated by the solenoid coil 100. The regulated output pressure is applied to the corresponding one of the hydraulic actuators AC1, AC2, AB1, AB2 and AB3. The solenoid coils 100 of the linear solenoid valves SL1-SL5 are energized independently of each other, under the control of the electronic control device 90, so that the hydraulic pressures to be applied to the respective hydraulic actuators AC1, AC2, AB1, AB2 and AB3 are regulated independently of each other.

Figure 3:
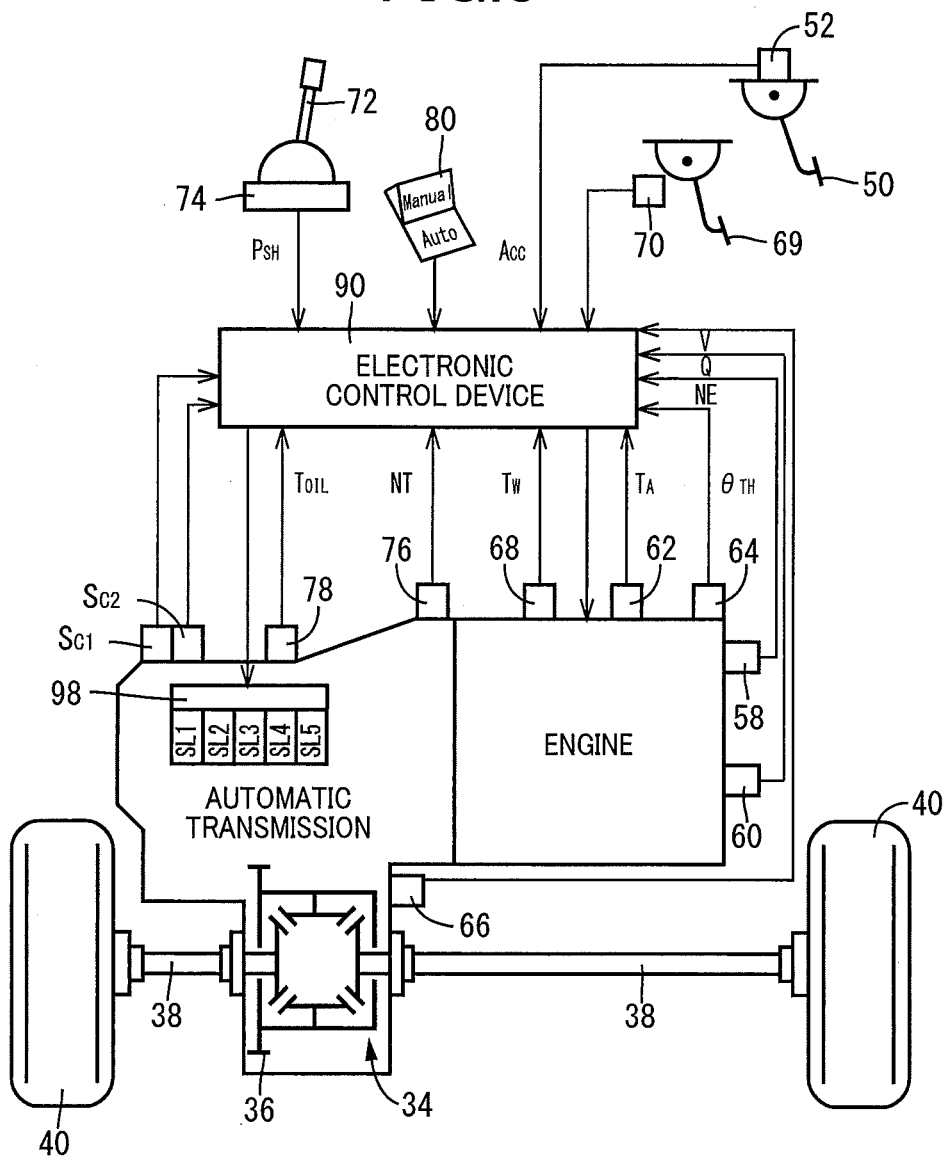
FIG. 3 is a block diagram for explaining major control functions of a control system provided for the vehicular automatic transmission of FIG. 1.

FIG. 3 is the block diagram for explaining major control functions of an electric control system provided on the vehicle to control the automatic transmission 10 in FIG. 1 and other devices of the vehicle. This electric control system is provided with an accelerator pedal operation amount sensor 52 for detecting an operation amount $A_{CC}$ of an accelerator pedal 50 which is so-called an "accelerator opening angle". An output signal of the sensor 52 indicative of the accelerator pedal operation amount $A_{CC}$ is applied to the electronic control device 90. The operation amount $A_{CC}$ of the accelerator pedal 50 increases with an increase of an output of the vehicle required by an operator of the vehicle. In this respect, the accelerator pedal 50 corresponds to a manually operated vehicle accelerating member, while the operation amount $A_{CC}$ corresponds to the operator's required vehicle output. The electric control system is further provided with: an engine speed sensor 58 for detecting an operating speed $N_E$ of the engine 30; an intake air quantity sensor 60 for detecting an intake air quantity Q of the engine 30; an intake air temperature sensor 62 for detecting a temperature $T_A$ of an intake air of the engine 30; a throttle sensor 64 which is provided with an idling switch and which is provided to detect a fully closed state (idling state) of an electronic throttle valve of the engine 30, and an opening angle $\theta_{TH}$ of the throttle valve; a vehicle speed sensor 66 for detecting a running speed V of the vehicle (a rotating speed $N_{OUT}$ of the output rotary member 24); a cooling water temperature sensor 68 for detecting a temperature TW of a cooling water of the engine 30; a brake switch 70 for detecting an operated position or a non-operated position of a foot brake pedal 69 provided for normal brake application to the vehicle; a shift position sensor 74 for detecting an operating position $P_{SH}$ of a shift lever 72; a turbine speed sensor 76 for detecting a turbine speed $N_T$ (=a rotating speed $N_{IN}$ of the input shaft 22); an AT oil temperature sensor 78 for detecting a temperature $T_{OIL}$ of a working oil within the hydraulic control unit 98; and a drive mode selector switch 80 for selecting a desired one of shifting patterns of the automatic transmission 10. The electronic control device 90 is configured to receive output signals of those sensors and switches indicative of the engine speed $N_E$, the intake air quantity Q, the intake air temperature $T_A$, the throttle valve opening angle $\theta_{TH}$, the vehicle running speed V, the engine cooling water temperature $T_W$, the operated or non-operated state of the brake pedal, the operating position $P_{SH}$ of the shift lever 72, the turbine speed $N_T$, the AT oil temperature $T_{OIL}$, and the selected shifting mode.

For example, the electronic control device 90 is a so-called microcomputer incorporating a CPU, a RAM, a ROM and an input-output interface. The CPU performs signal processing operations according to programs stored in the ROM while utilizing a temporary data storage function of the RAM, to implement various controls of the vehicle 10, such as controls of the linear solenoid valves SL1-SL5 to control the automatic transmission, and a control of an input clutch.

Figure 6:
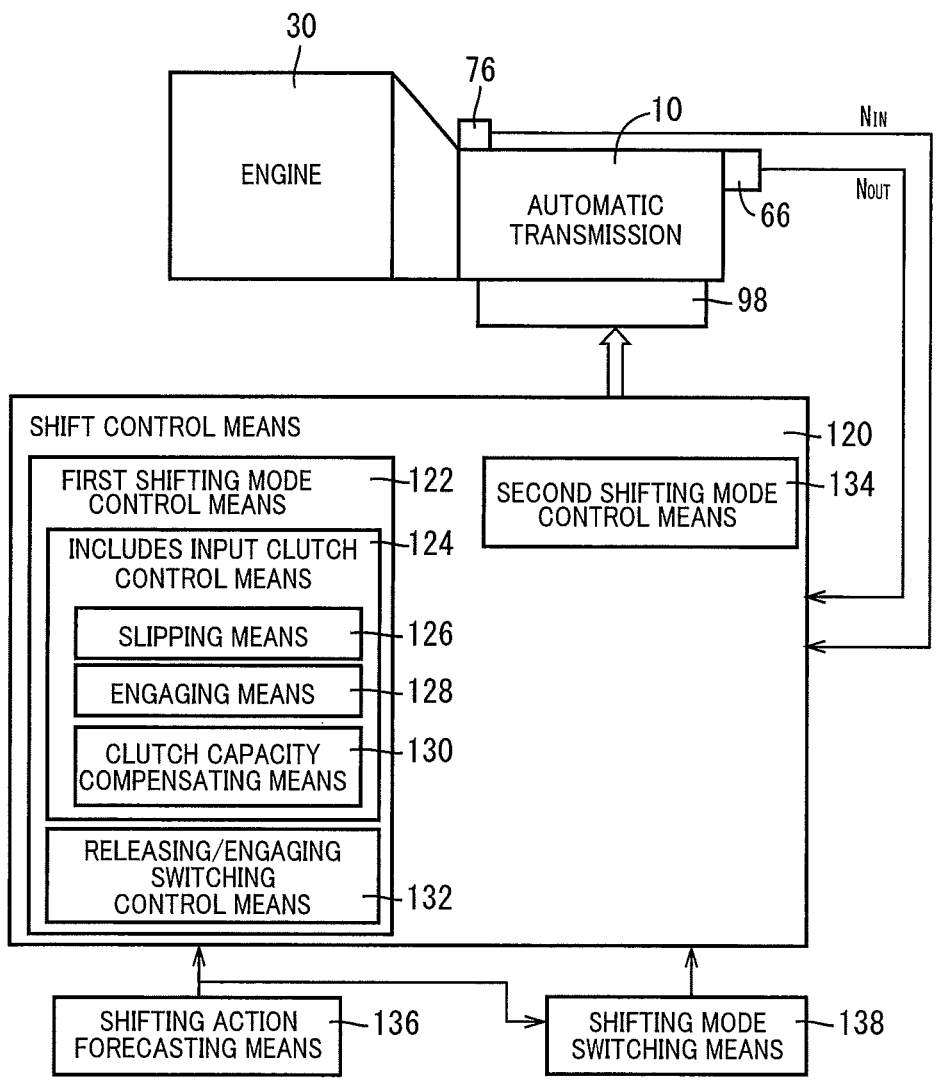
FIG. 6 is a functional block diagram showing major control functions of an electronic control device shown in FIG. 3.

FIG. 6 is the functional block diagram for explaining major control functions of the electronic control device 90. In the present embodiment, the electronic control device 90 includes shift control means 120, shifting action forecasting means 136 and shifting mode switching means 138 in a sense of functions. The shift control means 120 shown in FIG. 6 is configured to determine whether the automatic transmission is required to perform a shifting action, on the basis of the actual value of the vehicle running speed V and the accelerator pedal operation amount $A_{CC}$, and according to a stored shifting map shown in FIG. 7, and to implement a shifting control for controlling the appropriate linear solenoid valves SL1-SL5 to place two of the clutches C1 and C2 and brakes B1-B3 in the engaged states to perform the determined shifting action. Where it is determined that the shifting action is to establish the sixth-speed position, for example, the shift control means 120 generates drive signals for bringing the clutch C2 and the brake B1 into the engaged states.

The shift control means 120 described above includes first shifting mode control means 122 and second shifting mode control means 134 in a sense of functions. These first shifting mode control means 122 and second shifting mode control means 134 are configured to control the shifting actions of the automatic transmission 10 in respective first and second shifting modes according to the present invention. When the shift control means 120 determines that the automatic transmission 10 is required to perform a releasing/engaging switching operation, namely, a shifting action in which one of the frictional coupling devices is brought into the released state while another of the frictional coupling devices is brought into the engaged state, the shift control means 120 commands the first shifting mode control means 122 or the second shifting mode control means 134 to control the automatic transmission to perform the shifting action, depending upon an output of shifting mode switching means 138 described below.

The first shifting mode control means 122 includes input clutch control means 124 for controlling the input clutch, and releasing/engaging switching control means 132 for controlling the two frictional coupling devices to be respectively brought into the released and engaged states.

The input clutch control means 124 includes slipping means 126, engaging means 128 and clutch capacity compensating means 130 in a sense of functions. The slipping means 126 initiates a slipping action of the input clutch at a point of time a predetermined length of time prior to a point of time at which shifting action forecasting means 136 described below determines that a shifting action of the automatic transmission will take place. For instance, the predetermined length of time is several seconds. In the present embodiment, the "slipping action" of the input clutch is defined as an operating state of the input clutch consisting of not only a state in which the input clutch is actually slipping, that is, in which rotating speeds of two rotary elements associated with the input clutch have a difference, but also a state which is prior to a moment of initiation of the actual slipping action and in which a torque capacity of the input clutch is reduced. The state prior to the moment of initiation of the actual slipping action is more specifically defined as a state of the input clutch in which the input clutch will be placed in a slipping state if an additional drive force N is input to the input clutch. To place the input clutch in the slipping state, the input clutch is controlled such that the difference between the rotating speeds (speed difference) of the two rotary elements associated with the input clutch detected by speed sensors not shown is held within a predetermined range, or such that an engaging hydraulic pressure applied to the input clutch is raised by a predetermined amount above a level at which the speed difference is held within the predetermined range. The rotating speeds of the two rotary elements per se need not be detected, and may be obtained on the basis of detected rotating speeds of other rotary members rotated with the two rotary elements, by multiplying these detected rotating speeds by speed ratios of the above-indicated other rotary members with respect to the two rotary elements.

The input clutch described above is the frictional coupling device(s) of the automatic transmission 10 through which the drive force is input to the automatic transmission 10. In the automatic transmission 10 according to the present embodiment, at least one of the clutches C1 and C2 corresponds to the input clutch, depending upon the shifting action to be performed. The drive force is input to the automatic transmission 10 through one of the clutches C1 and C2 which is placed in the engaged state. Where the automatic transmission 10 is shifted up from the second-speed position to the third-speed position, for example, the clutch C1 is the input clutch. In this case, the shift-up action of the automatic transmission 10 from the second-speed position to the third-speed position takes place with a releasing action of the brake B1 and a concurrent engaging action of the brake B3. Namely, this shift-up action is a releasing/engaging switching operation of the automatic transmission 10, in which the brake B1 is a released-side frictional coupling device while the brake B3 is an engaged-side frictional coupling device.

The engaging means 128 is configured to terminate the slipping state of the input clutch after termination of the releasing/engaging switching operation performed under the control of the releasing/engaging switching control means 132 described below, that is, after the releasing action of the released-side frictional coupling device and the engaging action of the engaged-side frictional coupling device. In other words, the engaging means 128 increases the torque capacity of the input clutch to place the input clutch in the engaged state. In this respect, it is noted that the termination of the releasing/engaging switching operation of the two relevant frictional coupling devices can be confirmed when the engaging hydraulic pressure applied to the engaged-side frictional coupling device has been raised to a value corresponding to the fully engaged state of this coupling device, or when a predetermined length of time sufficient for the releasing/engaging switching control means 132 to complete the releasing/engaging switching operation has elapsed after a moment of initiation of the releasing/engaging switching operation.

The input clutch is brought into the engaged state by the engaging means 128 after the releasing/engaging switching operation by the releasing/engaging switching control means 132 is terminated, so that the engine speed $N_E$ can be changed with the engaging action of the input clutch. Further, the engaging action of the input clutch by the engaging means 128 is initiated while the input clutch is placed in the slipping state by the slipping means 126 so that the torque capacity of the input clutch is balanced with respect to the input torque. Accordingly, the engine speed $N_E$ and the corresponding input shaft speed $N_{IN}$ of the automatic transmission 10 can be changed smoothly while the input clutch is brought into the engaged state. Thus, a shock during the inertia phase can be reduced. Further, the input clutch is placed in the slipping state rather than the fully released state by the slipping means 126 before the input clutch is brought into the engaged state by the engaging means 128, so that an engaging shock of the input clutch can be made smaller than where the input clutch is placed in the fully released state before initiation of the engaging action.

When the input clutch is brought into the engaged state by the engaging means 128, the hydraulic pressure applied to the input clutch may be raised according to a predetermined pattern, or a slip ratio or the speed difference of the input clutch may be feedback-controlled so as to change according to predetermined patterns. These patterns of engaging control of the input clutch are predetermined by taking account of output torque, length of shifting action and shifting shock of the automatic transmission 10 during the releasing/engaging switching operation.

The clutch capacity compensating means 130 is configured to compensate the torque capacity of the input clutch according to a change of a torque assigned to be transmitted through the input clutch during the releasing/engaging switching operation. Described more specifically, the clutch capacity compensating means 130 determines whether the torque assigned to be transmitted through the input clutch is changed after the releasing/engaging switching operation with respect to that before the releasing/engaging switching operation. This determination is made on the basis of predetermined relationships. If it is determined that the torque assigned to be transmitted through the input clutch increases after the releasing/engaging switching operation, the torque capacity of the input clutch remaining at the value before the releasing/engaging switching operation is insufficient, resulting in a risk of an increase of an amount of slipping of the input clutch, and an unexpected rise of the engine speed $N_E$. If it is determined on the other hand that the torque assigned to be transmitted through the input clutch decreases after the releasing/engaging switching operation, the torque capacity of the input clutch remaining at the value before the releasing/engaging switching operation is excessive, resulting in a risk of an excessive amount of engagement of the input clutch, and an unexpected drop of the engine speed $N_E$. To overcome those risks, the clutch capacity compensating means 130 makes a compensation of the torque capacity of the input clutch after the releasing/engaging switching operation with the releasing and engaging actions of the respective released-side and engaged-side frictional coupling devices.

The compensation of the torque capacity of the input clutch is made by adjusting the engaging hydraulic pressure to be applied to the input clutch. The adjustment of the engaging hydraulic pressure is made according to the following equation (1).

$$P=((P0-Pr)/r1*r2+Pr) \quad (1)$$

In the equation (1), "P" represents an adjusted command value of the engaging hydraulic pressure to be applied to the input clutch, while "P0" represents a command value of the engaging hydraulic pressure to be applied to the input clutch before the releasing/engaging switching operation. Further, "Pr" represents a hydraulic pressure equivalent to a load acting on a return spring of the input clutch, which is so-called "piston end pressure", and "r1" and "r2" represent ratios of the assigned torques of the input clutch in the two speed positions of the automatic transmission between which the shifting action takes place, namely, ratios of the torques assigned to be transmitted through the input clutch, with respect to the torque input to the automatic transmission 10. When the input clutch is placed in the slipping state by the slipping means 126, the command value P0 of the hydraulic pressure is the hydraulic pressure to be applied to the input clutch so as to place the input clutch in the slipping state.

The releasing/engaging switching control means 132 is configured to control the releasing/engaging switching operation, that is, the releasing action of the released-side frictional coupling device and the engaging action of the engaged-side frictional coupling device. Described more specifically, the releasing/engaging switching control means 132 in the present embodiment brings the released-side and engaged-side frictional coupling devices respectively into the released and engaged states, after the input clutch is placed in the slipping state under the control of the slipping means 126 of the input clutch control means 124. The releasing action of the released-side frictional coupling device and the engaging action of the engaged-side frictional coupling device may take place during respective different periods of time partially overlapping each other, or concurrently during the same period of time. Since the releasing and engaging actions of the two frictional coupling devices take place while the input clutch is placed in the slipping state, the hydraulic pressure applied to the released-side frictional coupling device may be rapidly lowered to a value corresponding to the released state, while the hydraulic pressure applied to the engaged-side frictional coupling device may be rapidly raised to a value corresponding to the fully engaged state. In this case, a length of time during which an output torque of the automatic transmission changes with respect to the input torque due to a change of the gear ratio, that is, the length of time of the torque phase can be reduced.

It is also noted that since the input clutch is placed in the slipping state while the releasing/engaging switching operation is performed under the control of the releasing/engaging switching control means 132, the rotating speed of the input-side rotary element of the input clutch remains unchanged, while the rotating speed of the output-side rotary element changes according to the output shaft speed of the automatic transmission, and the speed ratio of the speed position to which the automatic transmission is shifted. Accordingly, a change of the engine speed $N_E$ and a change of the input shaft speed $N_{IN}$ of the automatic transmission 10 according to the change of the engine speed $N_E$ do not take place, so that generation of a large inertia torque during the releasing/engaging switching operation is reduced. A fact that the input clutch has been placed in the slipping state may be confirmed depending whether a sufficient length of time has elapsed after the hydraulic pressure applied to the input clutch has changed to a value corresponding to the slipping state, for example. The sufficient length of time is predetermined by taking account of a delayed response of the input clutch to the hydraulic pressure.

The second shifting mode control means 134 is configured to control the releasing/engaging switching operation in a shifting mode different from a shifting mode in which the releasing/engaging switching operation is controlled by the first shifting mode control means 122. Described more specifically, upon determination according to the shifting map shown in FIG. 7 by way of example that the releasing/engaging switching operation should take place, the second shifting mode control means 134 lowers the hydraulic pressure applied to the released-side frictional coupling device and gradually raises the hydraulic pressure applied to the engaged-side frictional coupling device, for initiating the releasing and engaging actions of the two frictional coupling devices in the torque phase of the automatic transmission. The rate of rise of the hydraulic pressure applied to the engaged-side frictional coupling device is determined so as to prevent the two frictional coupling devices from being both placed in the engaged states, namely, to prevent a so-called "tie-up" phenomenon of the two frictional coupling devices. Then, in the inertia phase, the second shifting mode control means 134 further lowers the hydraulic pressure applied to the released-side frictional coupling device, to the value corresponding to the fully released state, and further raises the hydraulic pressure applied to the engaged-side frictional coupling device.

After the engaged-side frictional coupling device has been brought into the fully engaged state in the inertia phase, the engine speed $N_E$ changes to a value corresponding to the speed ratio of the speed position to which the automatic transmission is shifted. Thus, in the releasing/engaging switching operation controlled by the second shifting mode control means 134, a behavior of the engaged-side frictional coupling device, that is, a change of the torque capacity of this frictional coupling device relates to both of a change of the rate of change of the torque in the torque phase and a change of the engine speed $N_E$ in the inertia phase. Therefore, the second shifting mode control means 134 controls the releasing/engaging switching operation such that the switching operation is performed for a longer period of time than the switching operation controlled by the first shifting mode control means 122, for the purpose of reducing the shifting shock.

In the releasing/engaging switching operation controlled by the second shifting mode control means 134, the input clutch may be controlled in various manners, unless the input clutch causes a change of the engine speed. Described more specifically, for instance, the input clutch may be kept in the engaged state without a change of its torque capacity before and after the moment of initiation of the releasing/engaging switching operation. Alternatively, the input clutch may be kept in the slipping state without a change of its torque capacity during the releasing/engaging switching operation, more specifically, from the moment of the determination that the switching operation should take place, to the moment of termination of the inertia phase.

The shifting action forecasting means 136 is configured to determine whether a shifting action of the automatic transmission will take place in the near future, for example, several seconds later. This determination is made on the basis of the present running condition of the vehicle. Described more specifically, the shifting action forecasting means 136 forecasts the vehicle running condition several seconds later, on the basis of the present vehicle running speed, the accelerator pedal operation amount or a rate of change of the accelerator pedal operation amount, and determines whether the shifting action will take place, depending upon whether a point representing the forecasted vehicle running condition in the near future moves across any shift-up or shift-down line of the shifting map shown in FIG. 7 by way of example. Further, the shifting action forecasting means 136 determines whether the forecasted shifting action is any one of the releasing/engaging switching operations, on the basis of the operating states of the frictional coupling devices indicated in FIG. 2.

The shifting mode switching means 138 is configured to select one of the first shifting mode control means 122 and the second shifting mode control means 134, for controlling the releasing/engaging switching operation of the automatic transmission 10. This selection is made on the basis of the accelerator pedal operation amount $A_{CC}$, the vehicle running speed V, the output of the drive mode selector switch 80, and the engine speed $N_E$, for example.

Described more specifically, the shifting mode switching means 138 selects the first shifting mode control means 122 to control the releasing/engaging switching operation, when at least one of the accelerator pedal operation amount $A_{CC}$ and the vehicle running speed V is smaller or lower than a predetermined threshold value. Namely, a variation of the output torque of the automatic transmission 10 in the inertia phase is likely to cause a shifting shock of the automatic transmission 10 while the output torque is comparatively small, with the accelerator pedal operation amount $A_{CC}$ or the vehicle running speed V being smaller or lower than the threshold value. In this vehicle running condition, therefore, the first shifting mode control means 122 is selected to perform the releasing/engaging switching operation with a reduced amount of shifting shock. The above-indicated threshold value is predetermined by experimentation, such that the shifting shock expected in the releasing/engaging switching operation controlled by the second shifting mode control means 134 is considerably severe if this switching operation is performed while the accelerator pedal operation amount $A_{CC}$ or the vehicle running speed V is lower than the threshold value.

Figure 7:
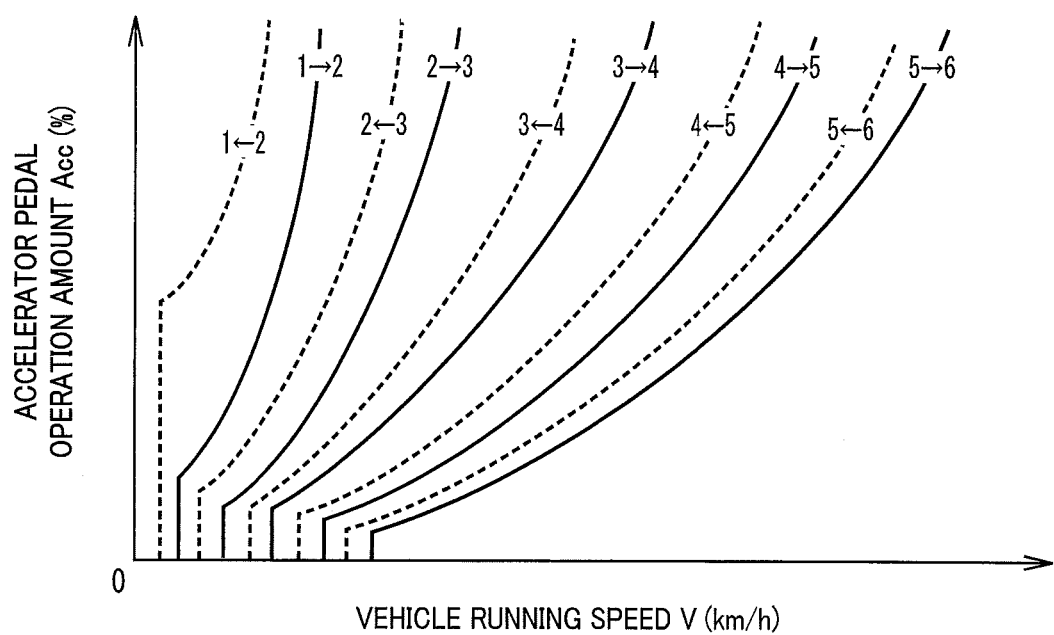
FIG. 7 is a view showing an example of a shifting map used by shift control means shown in FIG. 6.

The electronic control device 90 may include memory means (not shown) which stores a plurality of different shifting maps like the shifting map shown in FIG. 7 by way of example. One of these shifting maps is selected according to an operation of the drive mode selector switch 80 by the vehicle operator. In this case, the shifting mode switching means 138 selects the first shifting mode control means 122 to control the releasing/engaging switching operation when the shifting map corresponding to a sporty drive mode in which the speed ratio of the automatic transmission is fixed to one of predetermined values is selected. Namely, the vehicle operator tends to desire a high shifting response of the automatic transmission in the sporty drive mode, so that the first shifting mode control means 122 is selected in the sporty drive mode, to permit the releasing/engaging switching operation to be completed within a shorter length of time than when the second shifting mode control means 134 is selected. Where the automatic transmission 10 is operable in a manual shifting mode, that is, can be manually shifted according to an operation of the shift lever by the vehicle operator, the shifting mode switching means 138 selects the first shifting mode control means 122 to control the releasing/engaging switching operation when the automatic transmission 10 is placed in the manual shifting mode.

The shifting mode switching means 138 is further configured to select the first shifting mode control means 122 to control the releasing/engaging switching operation when the engine speed $N_E$ is lower than a predetermined threshold value, for the following reason. That is, there is known a flexible lock-up control in which a lock-up clutch (not shown) incorporated in the torque converter 32 is placed in a partially engaged state (slipping state), for improving a fuel economy of the vehicle. There is also known a problem that the engine operating at a comparatively low speed value $N_E$ generates a booming noise during the flexible lock-up control. The booming noise is generated due to a mass of a power transmitting system between the lock-up clutch placed in the slipping state and the engine. In view of this fact, the first shifting mode control means 122 places a starting clutch in the form of the input clutch in the slipping state, rather than the lock-up clutch placed in the slipping state, so that the above-indicated mass is increased to reduce the booming noise generated at the lower engine speed $N_E$. Accordingly, the threshold value is predetermined such that the flexible lock-up control is inhibited to reduce the booming noise when the engine speed $N_E$ is lower than the threshold value.

FIG. 8 is the flow chart for explaining a major control operation of the electronic control device 90 according to the present embodiment. This control operation is repeatedly performed with a predetermined cycle time of about several milliseconds to about several tens of milliseconds, for instance. Referring to this flow chart, there will be described an example of the control operation of the electronic control device 90 to control a shift-up action of the automatic transmission 10 from the second-speed position to the third-speed position. In this example, the clutch C1 is the input clutch, and the brake B1 is the released-side frictional coupling device while the brake B3 is the engaged-side frictional coupling device. The control operation illustrated in FIG. 8 is initiated with a step S1 (hereinafter "step" being omitted) corresponding to the shifting action forecasting means 136, to forecast whether a shifting action, in particular, a releasing/engaging switching operation of the automatic transmission 10 will take place within a predetermined length of time. This determination is made on the basis of the present running condition of the vehicle. If the releasing/engaging switching operation is forecasted, the control flow goes to S2. If the releasing/engaging switching operation is not forecasted, the control flow goes to S9 to implement a control other than the controls by the first shifting mode control means 122 and the second shifting mode control means 134. For instance, a control of a shifting action other than the releasing/engaging switching operation is implemented if such a shifting action is forecasted.

The S2 corresponding to the shifting mode switching means 138 is implemented to determine whether the releasing/engaging switching operation forecasted in the S1 should be performed in the first shifting mode under the control of the first shifting mode control means 122, or in the second shifting mode under the control of the second shifting mode control means 134. This determination is made depending upon either a result of one of: a determination as to whether the accelerator pedal operation amount $A_{CC}$ is equal to or smaller than the predetermined threshold value; a determination as to whether the vehicle running speed V is equal to or lower than the predetermined threshold value; a determination as to whether the sporty drive mode is selected; a determination as to whether the automatic transmission is placed in the manual shifting mode; and a determination as to whether the engine speed $N_E$ is equal to or lower than the predetermined threshold value, or results of selected combinations of the above-indicated determinations. If an affirmative determination is obtained in the S2, this means that the releasing/engaging switching operation should be performed in the first shifting mode. In this case, the control flow goes to S3. If a negative determination is obtained in the S2, this means that the releasing/engaging switching operation should be performed in the second shifting mode. In this case, the control flow goes to S8.

The following S3-S7 correspond to the first shifting mode control means 122, and the S3 and S5-S7 correspond to the input clutch control means 124. In the S3, which corresponds to the slipping means 126 of the input clutch control means 124, the input clutch C1 is brought into the slipping state, namely, into a state in which the two rotary elements associated with the input clutch C1 actually slip on each other (so as to have a difference between their rotating speeds), or into a state immediately prior to the actually slipping state.

The S4 corresponds to the releasing/engaging switching control means 132. In the S4 implemented after the S3 is implemented to bring the input clutch C1 into the slipping state, the brake B1 which is the released-side frictional coupling device is brought into the released state while the brake B3 which is the engaged-side frictional coupling device is brought into the engaged state. These releasing and engaging actions of the brake B1 and B3 in the S4 are initiated after the shifting control means 120 has determined, on the basis of the actual vehicle running condition and according to the shifting map shown in FIG. 7, that the releasing/engaging switching operation forecasted in the S1 should be actually performed.

The S5 and S6 correspond to the clutch capacity compensating means 130. Initially, the S5 is implemented to determine whether the torque assigned to be transmitted through the input clutch C1 after completion of the releasing/engaging switching operation will change with respect to that before initiation of the releasing/engaging switching operation. This determination may be made on the basis of a determination table which is stored in a memory and which is predetermined for each of different releasing/engaging switching operations of the automatic transmission, depending upon whether the two relevant frictional coupling devices controlled to perform the releasing/engaging switching operation are two clutches, two brakes, or the like, for instance. If it is determined that the assigned torque of the input clutch C1 changes, that is, if an affirmative determination is obtained in the S5, the control flow goes to the S6. If it is determined that the assigned torque of the input clutch C1 does not change, that is, if a negative determination is obtained in the S5, this means that the torque capacity of the input clutch C1 need not be compensated. In this case, the control flow goes to the S7 while skipping the S6.

In the S6 which is implemented if the affirmative determination is obtained in the S5, the torque capacity of the input clutch C1 is compensated. This compensation is made by changing the engaging hydraulic pressure to be applied to the input clutch C1, to a value calculated according to the above-indicated equation (1). The compensation makes it possible to prevent an unexpected rise or drop of the engine speed $N_E$ as a result of the releasing/engaging switching operation.

In the S7 corresponding to the engaging means 128, the engaging hydraulic pressure applied to the input clutch C1 placed in the slipping state is raised, to bring the input clutch C1 into the fully engaged state. Since the rise of the engaging hydraulic pressure of the input clutch C1 causes a change of the engine speed $N_E$, or a change of the input shaft speed $N_{IN}$ of the automatic transmission 10 corresponding to the engine speed $N_E$, the engaging hydraulic pressure is raised according to a predetermined pattern formulated to prevent an abrupt change of the engine speed $N_E$ or the input shaft speed $N_{IN}$, for example.

The S8 which is implemented if the negative determination is obtained in the S2 corresponds to the second shifting mode control means 134. In the S8, the releasing/engaging switching operation is performed in the second shifting mode. Described more specifically, the releasing and engaging actions of the released-side frictional coupling device B1 and the engaged-side frictional coupling device B3 are performed without the tie-up phenomenon in the torque phase, and such that the engaging hydraulic pressure to be applied to the engaged-side frictional coupling device B3 is raised in the inertia phase, so that the frictional coupling device B3 is gradually brought into the fully engaged state. Further, the engaging hydraulic pressure of the engaged-side frictional coupling device B3 is raised so as to control the change of the engine speed $N_E$, or the change of the input shaft speed $N_{IN}$ of the automatic transmission 10 corresponding to the engine speed $N_E$. It is noted that the releasing and engaging actions of the two frictional coupling devices B1 and B3 in the S8 are initiated after the shifting control means 120 has determined, on the basis of the actual vehicle running condition and according to the shifting map shown in FIG. 7, that the releasing/engaging switching operation forecasted in the S1 should be actually performed.

It is further noted that a length of time $T_A$ required for completing the releasing and engaging actions of the released-side and engaged-side frictional coupling devices B1 and B3 in the S4 is set to be shorter than a length of time $T_B$ required for completing the releasing and engaging actions of the frictional coupling devices B1 and B3 in the S8.

Figure 9A:
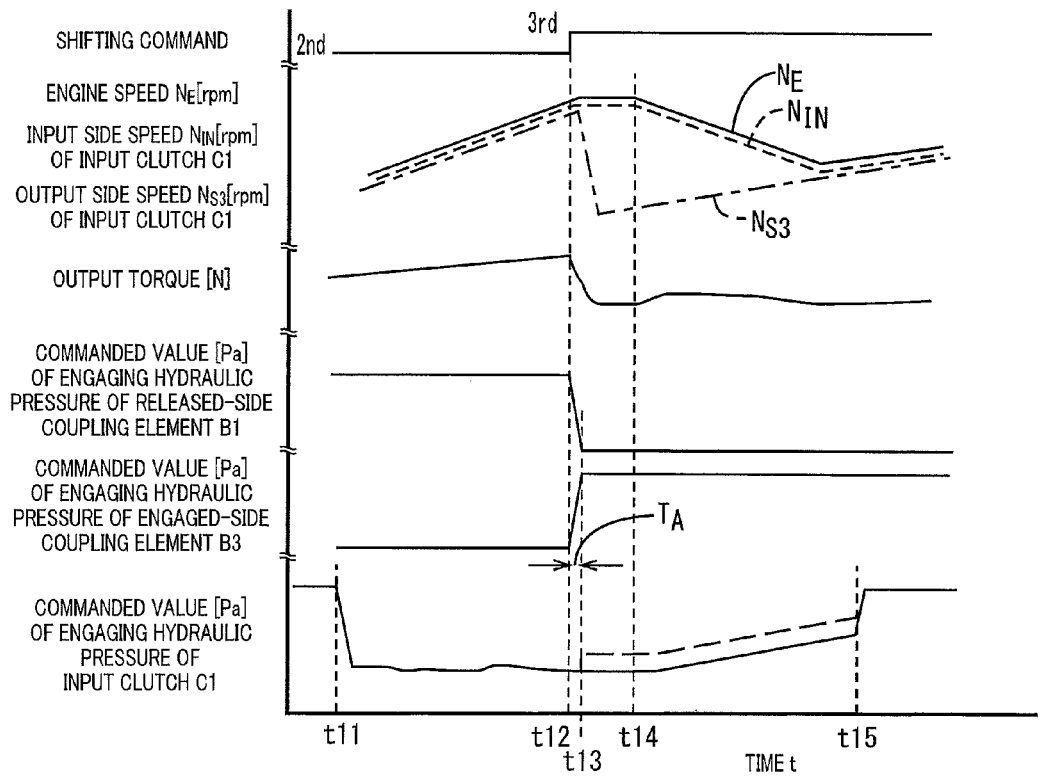
FIGS. 9A and 9B are time charts illustrating first and second modes of shifting control of the automatic transmission implemented by the electronic control device according to the present invention, in comparison with each other.
Figure 9B:
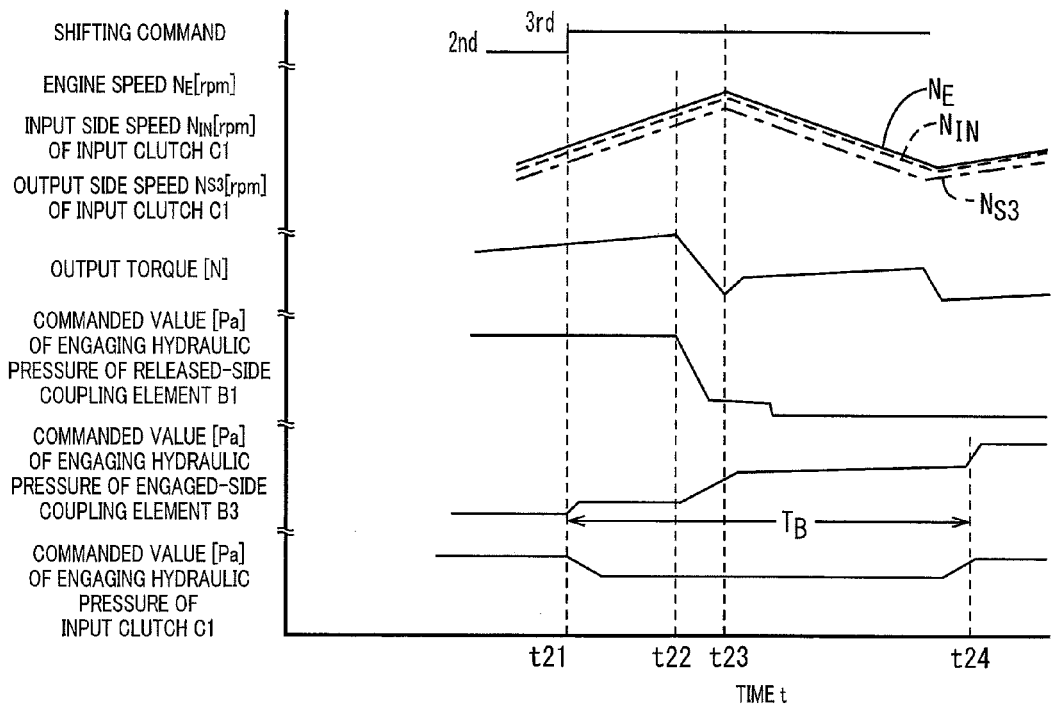

FIGS. 9A and 9B are the time charts for explaining the control operation of the electronic control device 90 according to the present embodiment, showing changes of the engine speed $N_E$, rotating speeds of the two rotary elements associated with the input clutch C1, an engine output torque NT, the engaging hydraulic pressure to be applied to the released-side frictional coupling device B1, the engaging hydraulic pressure to be applied to the engaged-side frictional coupling device B3, and the engaging hydraulic pressure to the applied to the input clutch C1. In the present embodiment, the input-side one of the two rotary elements associated with the input clutch C1 is the input shaft 22 of the automatic transmission 10, while the output-side one of the two rotary elements is the sun gear S3. FIG. 9A shows the releasing/engaging switching operation performed in the first shifting mode under the control of the first shifting mode control means 122, while FIG. 9B shows the releasing/engaging switching operation performed in the second shifting mode under the control of the second shifting mode control means 134. FIGS. 9A and 9B, points of time t12 and t21 at which the determination that the releasing/engaging switching operation should be performed is made are indicated so as to be coincident with each other in time, for easier comparison of the first and second shifting modes with each other.

Referring first to FIG. 9A, at a point of time t11, the shifting action forecasting means 136 forecasts that the releasing/engaging switching operation will take place, and the shifting mode switching means 138 selects the first shifting mode control means 122 to control the releasing/engaging switching operation in the first shifting mode. Further, the slipping means 126 initiates at the point of time t11 an operation to place the input clutch C1 in the slipping state. For instance, the slipping means 126 implements a feedback control of the slipping state of the input clutch C1 such that a slipping speed of the input clutch C1 is held not higher than a predetermined value. At a point of time t12, it is determined that the releasing/engaging switching operation of the automatic transmission 10 should be performed. This determination is made on the basis of the vehicle running condition, more specifically, as a result of a determination that the point representing the vehicle running speed and the accelerator pedal operation amount moves across the relevant shifting line of the shifting map shown in FIG. 7 by way of example. During a time period from the point of time t12 to a point of time t13, the released-side frictional coupling device B1 is brought into the released state while the engaged-side frictional coupling device B3 is brought into the engaged state. In the releasing/engaging switching operation indicated in FIG. 9A, this time period from the point of time t12 to the point of time t13 corresponds to the torque phase.

At a point of time t14 which is after a sufficient length of time from completion of the releasing and engaging actions of the released-side and engaged-side frictional coupling devices B1 and B3, the engaging means 128 initiates an operation to bring the input clutch C1 into the engaged state. That is, the engaging hydraulic pressure applied to the input clutch C1 is gradually raised with a change of the engine speed $N_E$, during a time period from the point of time t14 to a point of time t15. In other words, the engine speed $N_E$ is changed to a value corresponding to the speed position to which the automatic transmission 10 is shifted. The engaging hydraulic pressure applied to the input clutch C1 is raised to bring the input clutch C1 into the fully engaged state at the point of time t15 such that the engine speed $N_E$ has been changed at this point of time t15 to the value corresponding to the eventually established speed position of the automatic transmission 10. In the releasing/engaging switching operation indicated in FIG. 9A, the time period from the point of time t13 to the point of time t15 corresponds to the inertia phase.

Referring next to FIG. 9B, at a point of time t21, it is determined that the releasing/engaging switching operation of the automatic transmission 10 should be performed. This determination is made on the basis of the vehicle running condition, more specifically, as a result of a determination that the point representing the vehicle running speed and the accelerator pedal operation amount moves across the relevant shifting line of the shifting map shown in FIG. 7 by way of example. In response to this determination to perform the releasing/engaging switching operation, a piston of the hydraulic actuator of the engaged-side frictional coupling device B3 is advanced, during a time period from the point of time t21 and a point of time t22, to a stand-by position at which the engaging action will be initiated. During a subsequent time period from the point of time t22 to a point of time t23, the released-side frictional coupling device B1 is brought into the released state while the engaged-side frictional coupling device B3 is brought into the engaged state, so that the releasing/engaging switching operation is performed. In the releasing/engaging switching operation indicated in FIG. 9B, the time period from the point of time t22 to the point of time t23 corresponds to the torque phase.

During a time period from the point of time t23 to a point of time t24, the engaging hydraulic pressure applied to the released-side frictional coupling device B1 is further lowered to bring the frictional coupling device B1 into the fully released state, while the engaging hydraulic pressure applied to the engaged-side frictional coupling device B3 is gradually raised to bring the frictional coupling device B3 into the fully engaged state. During a rise of the engaging hydraulic pressure of the engaged-side frictional coupling device B3, the engine speed $N_E$ is changed toward a value corresponding to the eventually established speed position. The engaging hydraulic pressure of the frictional coupling device B3 is raised to bring the frictional coupling device B3 into the fully engaged state at the point of time t24 such that the engine speed $N_E$ has been changed at this point of time t24 to the value corresponding to the speed position to which the automatic transmission 10 is shifted. In the releasing/engaging switching operation indicated in FIG. 9B, the time period from the point of time t23 to the point of time t24 corresponds to the inertia phase.

In the releasing/engaging switching operation indicated in FIG. 9B, the engaging hydraulic pressure applied to the input clutch C1 is lowered. This lowering of the engaging hydraulic pressure of the input clutch C1 does not contribute to a change of the engine speed $N_E$. However, the engaging hydraulic pressure of the input clutch C1 need not be lowered in the releasing/engaging switching operation performed in the second shifting mode, as in the present embodiment described above.

The length of time $T_A$ required for the releasing and engaging actions of the released-side and engaged-side frictional coupling devices B1 and B3 in the S4 described above by reference to FIG. 8 is equal to the time period from the point of time t12 to the point of time t13 indicated in FIG. 9A. On the other hand, the length of time $T_B$ required for the releasing and engaging actions of the released-side and engaged-side frictional coupling devices B1 and B3 in the S8 is equal to the time period from the point of time t21 to the point of time t24 indicated in FIG. 9B. The length of time $T_A$ is set to be shorter than the length of time $T_B$.

A broken line in FIG. 9A represents a commanded value of the engaging hydraulic pressure of the input clutch C1 where the torque capacity of the input clutch C1 is compensated by the clutch capacity compensating means 130 at the point of time t13. A solid line represents a commanded value of the engaging hydraulic pressure of the input clutch C1 where the torque capacity of the input clutch C1 is not compensated. As described above, the torque capacity of the input clutch C1 is increased or reduced by the clutch capacity compensating means 130, depending upon the kinds of the released-side and engaged-side frictional coupling devices.

As described above, the control device 90 according to the present embodiment is configured to control the automatic transmission 10 provided with the input clutch C1 through which a drive force is input to the automatic transmission 10, the released-side frictional coupling device B1 to be placed in the released state to perform the releasing/engaging switching operation of the automatic transmission 10, and the engaged-side frictional coupling device B3 to be placed in the engaged state to perform the releasing/engaging switching operation. According to the control device 90, the first shifting mode control means 122 executes the first shifting mode, in which, the input clutch C1 is placed in the slipping state under the control of the slipping means 126 (S3), the releasing/engaging switching control means 132 (S4) controls the releasing/engaging switching operation in which the released-side frictional coupling device B1 is brought into the released state, and the engaged-side frictional coupling device B3 is brought into the engaged state, and the engaging means 128 (S7) brings the input clutch C1 into the engaged state with a change of the operating speed $N_E$ of the engine 30 connected to the input shaft 22 of the automatic transmission 10. While the prior art requires a complicated control for coordination to reduce generation of a shifting shock in the releasing and engaging actions of the frictional coupling devices, the present embodiment permits an easier control of the releasing and engaging actions. In addition, the input clutch C1 is brought into the engaged state after the released-side frictional coupling device B1 and the engaged-side frictional coupling device B3 are respectively brought into the released and engaged states, so that the shifting action of the automatic transmission 10 can be controlled with a high degree of uniformity of shifting characteristics, and easily coordinated, by controlling the engaging action of the input clutch C1, irrespective of a specific one of a plurality of different shifting actions of the automatic transmission 10 each involving the releasing and engaging actions of the two frictional coupling devices.

The present embodiment is further configured such that the shifting action can be performed in the second shifting mode under the control of the second shifting mode control means 134. In this second shifting mode, the engaged-side frictional coupling device B3 is brought into the engaged state with a change of the operating speed $N_E$ of the engine 30, while the released-side frictional coupling device B1 is brought into the released state. The length of time required for completing the releasing action of the released-side frictional coupling device B1 and the engaging action of the engaged-side frictional coupling device B3 in the first shifting mode is shorter than that in the second shifting mode ($T_A < T_B$). Accordingly, the shifting action can be performed in one of the first and second shifting modes which is selected depending upon the condition in which the shifting action is required to be performed.

While the preferred embodiment of this invention has been described in detail by reference to the drawings, for illustrative purpose only, it is to be understood that the invention may be embodied with various changes and improvements which may occur to those skilled in the art.

In the illustrated embodiment, the input clutch control means 124 includes the clutch capacity compensating means 130. However, the clutch capacity compensating means 130 is not essential, and the present invention has a significant advantage without the compensation of the torque capacity of the input clutch by the clutch capacity compensating means 130. Similarly, the present invention has a significant advantage without provision of the second shifting mode control means 134 and the shifting mode switching means 138.

In the illustrated embodiment, the input clutch C1 is brought into the slipping state when the shifting action forecasting means 136 forecasts that a releasing/engaging switching operation will take place. However, this control of the input clutch C1 is not essential. For instance, the input clutch C1 may be held in a state immediately prior to the actually slipping state, during running of the vehicle. In this case, the shifting action forecasting means 136 need not be provided.

In the illustrated embodiment, the automatic transmission is shifted up from the second-speed position to the third-speed position. However, the principle of this invention is equally applicable to any other releasing/engaging switching operation of the automatic transmission. Further, each of the released-side frictional coupling device and the engaged-side frictional coupling device may be a brake or a clutch. Although the automatic transmission 10 in the illustrated embodiment has six forward drive positions, the present invention is equally applicable to an automatic transmission having any number of forward-drive positions, provided the forward-drive position include any two speed positions between which the automatic transmission is shifted with releasing and engaging action of respective two frictional coupling devices. Further, the releasing/engaging switching operation is not limited to a shifting action between adjacent two speed positions, and may be a shifting action between non-adjacent two speed positions such as a shifting action from the second-speed position to the fourth-speed position.

In the illustrated embodiment, the shifting action forecasting means 136 forecasts a releasing/engaging switching operation on the basis of the present running condition of the vehicle. However, the shifting action forecasting means 136 may depend on a hysteresis of the vehicle running condition in addition to or in place of the present vehicle running condition, to determine whether the releasing/engaging switching operation will take place.

While the embodiment and modifications have been described, it is to be understood that various other changes may be made without departing the spirit and scope of the present invention.

NOMENCLATURE OF REFERENCE SIGNS

10: Automatic transmission
22: Input shaft
30: Engine
90: Electronic control device
120: Shift control means
122: First shifting mode control means
124: Input clutch control means
126 (S3): Slipping means
128 (S7): Engaging means
130 (S5, S6): Clutch capacity compensating means
132 (S4): Releasing/engaging switching control means
134 (S8): Second shifting mode control means
136 (S1): Shifting action forecasting means
138 (S2): Shifting mode switching means
C1: Clutch (Input clutch)
B1: Brake (Released-side frictional coupling device)
B3: Brake (Engaged-side frictional coupling device)

The invention claimed is:
1. A control apparatus for an automatic transmission provided with an input clutch through which a drive force generated by an engine is input to the automatic transmission, a released-side frictional coupling device to be placed in a released state to perform a shifting action of the automatic transmission, and an engaged-side frictional coupling device to be placed in an engaged state to perform said shifting action, said control apparatus comprising:
a first shifting mode control portion configured to perform said shifting action in a first shifting mode; the first shifting mode control portion comprising:

a slipping portion configured to place said input clutch in a slipping state, a releasing/engaging switching control portion configured to perform a switching control in which said released-side frictional coupling device is brought into the released state, and said engaged-side frictional coupling device is brought into the engaged state, while said input clutch is placed in the slipping state under the control of said slipping portion, and an engaging portion configured to place said input clutch in an engaged state after the switching control, wherein said first shifting mode control portion performs said shifting action in said first shifting mode with a change of an operating speed of said engine connected to an input shaft of said automatic transmission by engaging said input clutch by said engaging portion.

2. The control apparatus according to claim 1, further comprising a second shifting mode control portion configured to perform said shifting action of said automatic transmission in a second shifting mode, wherein:

said second shifting mode control portion executes said switching control in which said engaged-side frictional coupling device is brought into the engaged state, while said released-side frictional coupling device is brought into the released state, said second shifting mode control portion performs said shifting action in said second shifting mode with a change of the operating speed of said engine by engaging said engaged-side frictional coupling device, and a length of time required for completing a releasing action of said released-side frictional coupling device and an engaging action of said engaged-side frictional coupling device in said first shifting mode is shorter than that in said second shifting mode.

3. The control apparatus according to claim 1, wherein the input clutch is disposed between the engine and both of said released-side frictional coupling device and said engaged-side frictional coupling device.

4. The control apparatus according to claim 2, wherein the input clutch is disposed between the engine and both of said released-side frictional coupling device and said engaged-side frictional coupling device.

* * * * *